(12) United States Patent
Lainema et al.

(10) Patent No.: US 9,743,092 B2
(45) Date of Patent: Aug. 22, 2017

(54) VIDEO CODING WITH HELPER DATA FOR SPATIAL INTRA-PREDICTION

(71) Applicant: Nokia Technologies Oy, Espoo (FI)

(72) Inventors: Jani Lainema, Tampere (FI); Alireza Aminlou, Tampere (FI)

(73) Assignee: Nokia Technologies Oy, Espoo (FI)

( * ) Notice: Subject to any disclaimer, the term of this patent is extended or adjusted under 35 U.S.C. 154(b) by 206 days.

(21) Appl. No.: 14/881,493

(22) Filed: Oct. 13, 2015

(65) Prior Publication Data

US 2017/0105003 A1 Apr. 13, 2017

(51) Int. Cl.
*H04N 19/159* (2014.01)
*H04N 19/593* (2014.01)
*H04N 19/44* (2014.01)

(52) U.S. Cl.
CPC ........... *H04N 19/159* (2014.11); *H04N 19/44* (2014.11); *H04N 19/593* (2014.11)

(58) Field of Classification Search
CPC ..... H04N 19/159; H04N 19/593; H04N 19/44
See application file for complete search history.

(56) References Cited

U.S. PATENT DOCUMENTS

2013/0343648 A1\* 12/2013 Sato ........................ G06T 9/004
382/166

OTHER PUBLICATIONS

"Series H: Audiovisual and Multimedia Systems, Infrastructure of Audiovisual Services—Coding of Moving Video", High Efficiency Video Coding, Telecommunication Standardization Sector of ITU, H.265, (Apr. 2015), (634 pages).

\* cited by examiner

*Primary Examiner* — Nam Pham
(74) *Attorney, Agent, or Firm* — Harrington & Smith (57) ABSTRACT

For decoding a video stream, an encoded video stream is received with an indication of a prediction mode and an indication of one or more prediction helper values. While decoding this encoded video stream, a predicted value is calculated for each of at least one sample based on the indicated prediction mode and on the prediction helper value(s). The decoded video stream, incorporating each of the at least one samples as decoded using the respective calculated predicted value, is then output to at least one of a computer readable memory and a graphical display. An optional step function can be utilized to aid the helper values and enable non-linear prediction values in a given row or column of a prediction unit. At the encoder side the encoder decides the prediction helper values that it uses to encode the video stream that is stored or transmitted to the decoder.

17 Claims, 6 Drawing Sheets

VIDEO CODING WITH HELPER DATA FOR SPATIAL INTRA-PREDICTION

TECHNOLOGICAL FIELD

The described invention relates to processing of digital images and videos, and particularly to encoding and decoding of such images and video for telecommunications and storage thereof.

BACKGROUND

Acronyms used herein are listed below following the detailed description. The recommended specifications ITU-T H.263 and H.264 (04/2015) provide typical hybrid video codecs in that they encode the video information in two phases. Firstly pixel values in a certain picture area (termed a "block") are predicted for example by motion compensation means or by spatial means. Motion compensation generally includes finding and indicating an area in one of the previously coded video frames that corresponds closely to the block being coded; spatial means generally includes using the pixel values around the block to be coded in a specified manner. Secondly the prediction error is coded; the prediction error is the difference between the predicted block of pixels and the original block of pixels. Coding the prediction error is typically done by transforming the difference in pixel values using a specified transform such as for example a Discreet Cosine Transform (DCT) or some variant of it, quantizing the coefficients and entropy-coding the quantized coefficients. By varying the fidelity of the quantization process, the encoder can control the balance between the accuracy of the pixel representation (the picture quality) and the size of the resulting coded video representation (the file size or transmission bitrate).

Another image/video coding standard is ITU-T H.265, also referred to as High Efficiency Video Coding HEVC). This approach builds intra frame sample prediction blocks using directional filtering, and projects the sample location of the sample to be predicted onto the reference row using a selected prediction direction, and also applies a 1-dimensional linear filter to interpolate a predicted value for the sample. For the case of directly horizontal or directly vertical prediction directions, one of the block boundaries is additionally filtered with a sample gradient based filter. HEVC also defines direct current (DC) and planar prediction modes. DC prediction calculates the DC component of the reference samples and uses that as a prediction for the samples within a block, whereas planar prediction calculates an average of two linear predictions to predict blocks with smooth sample surface.

From the above review it is clear that spatial intra prediction typically creates a sample prediction block based on decoded samples around the block. That approach is able to model certain kinds of structures in the block very well, but at the same time it fails to predict some common classes of textures. For example, the directional sample prediction is able to accurately model shapes that match with the supported prediction directions, but when moving further away from the reference samples the prediction tends to become less reliable and often some prediction error aligned with the selected prediction direction begins to appear. Embodiments of these teachings detailed more particularly below address this shortfall or the prior art and others.

SUMMARY

According to a first aspect of these teachings there is a method for decoding a video stream, the method comprising: receiving with an encoded video stream an indication of a prediction mode and an indication of one or more prediction helper values; while decoding the encoded video stream, calculating a predicted value for each of at least one sample based on the received indication of the prediction mode and on the received one or more prediction helper values; and tangibly outputting the decoded video stream to at least one of a computer readable memory and a graphical display, such that the decoded video stream that is output incorporates each of the at least one sample as decoded using the respective calculated predicted value.

According to a second aspect of these teachings there is a computer readable memory storing computer program instructions that, when executed by one or more processors, cause a host decoder device to perform actions directed to decoding a video stream. In this regard the actions include: receiving with an encoded video stream an indication of a prediction mode and an indication of one or more prediction helper values; while decoding the encoded video stream, calculating a predicted value for each of at least one sample based on the received indication of the prediction mode and on the received one or more prediction helper values; and tangibly outputting the decoded video stream to at least one of a computer readable memory and a graphical display, such that the decoded video stream that is output incorporates each of the at least one sample as decoded using the respective calculated predicted value.

According to a third aspect of these teachings there is an apparatus for decoding a video stream. The apparatus comprises at least one computer readable memory storing computer program instructions and at least one processor. The computer readable memory with the computer program instructions is configured, with the at least one processor, to cause the apparatus to perform actions comprising: receiving with an encoded video stream an indication of a prediction mode and an indication of one or more prediction helper values; while decoding the encoded video stream, calculating a predicted value for each of at least one sample based on the received indication of the prediction mode and on the received one or more prediction helper values; and tangibly outputting the decoded video stream to at least one of a computer readable memory and a graphical display, such that the decoded video stream that is output incorporates each of the at least one sample as decoded using the respective calculated predicted value.

These and other aspects of the invention are detailed below with more particularity.

DETAILED DESCRIPTION

Figure 1:
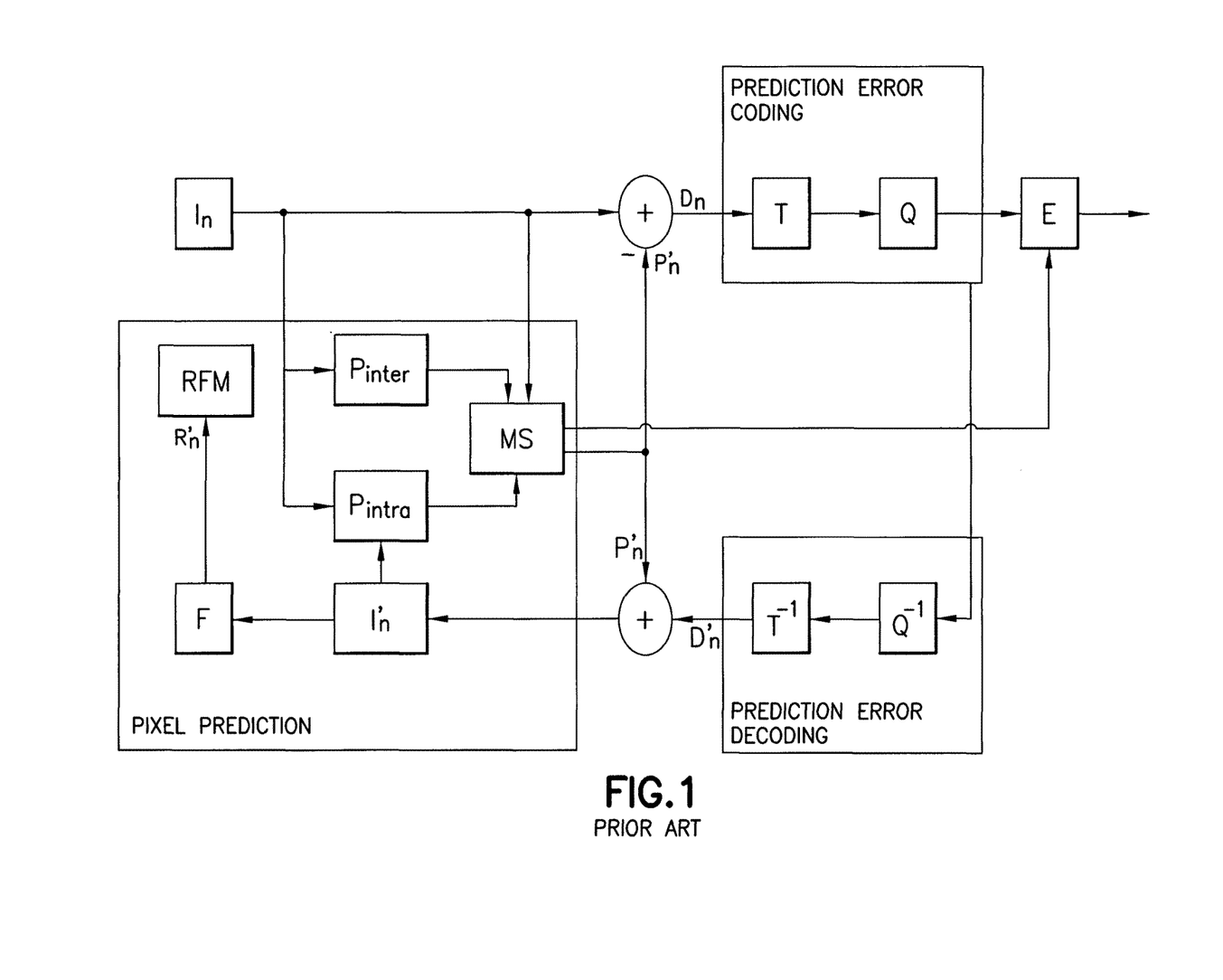
FIG. 1 is a schematic block diagram of a video encoder that uses the two-phase process of pixel prediction and prediction error as is known in the video coding arts.

Videos are streams of individual pictures or images in sequence, and video coding exploits the fact that among discrete sets of images often much of the image remains unchanged or changed very little. As such one image can be constructed with reference to other images that are near in sequence around the picture of interest as well as with reference to other sections of the same image, and often individual images of a video are referred to as frames. Video coding/decoding thus uses both inter-frame prediction which predicts for the subject frame from one or more other frames, and intra-frame prediction which predicts for one portion of the subject frame from one or more other portions of the subject frame. A codec refers typically to the software that executes a specific coding and decoding procedure, though in principle nothing prevents a codec from being embodied in hardware (circuitry) or a combination of hardware and software. To better appreciate the advance these teachings provide over conventional codecs, FIG. 1 is a schematic block diagram of a generic video encoder that uses the two-phase process of pixel prediction and prediction error as mentioned in the background above and explained in further detail below. FIG. 1 uses the following representations:

$I_n$ Image to be encoded
$P'_n$ Predicted representation of an image block
$D_n$: Prediction error signal
$D'_n$ Reconstructed prediction error signal
$I'_n$ Preliminary reconstructed image
$R'_n$ Final reconstructed image
$T, T^{-1}$ Transform and inverse transform
$Q, Q^{-1}$ Quantization and inverse quantization
E Entropy encoding
RFM Reference frame memory
$P_{inter}$ Inter prediction
$P_{intra}$ Intra prediction
MS Mode selection
F Filtering The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.
In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs such as HEVC, video pictures are divided into coding units (CU) covering the area of the picture. A CU consists of one or more prediction units (PU) defining the prediction process for the samples within the CU and one or more transform units (TU) defining the prediction error coding process for the samples in that CU. Typically, a CU consists of a square block of samples with a size selectable from a predefined set of possible CU sizes. A CU with the maximum allowed size is typically referred to as a LCU (largest coding unit) or a CTU (coding tree unit), and the video picture is divided into non-overlapping CTUs. A CTU can be further split into a combination of smaller CUs, for example by recursively splitting the CTU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU; for example motion vector information for inter predicted PUs and intra prediction directionality information for intra predicted PUs. Similarly each TU is associated with information describing the prediction error decoding process for the samples within the said TU, and this information may for example include DCT coefficient information. In the storage and/or transmission of encoded video it is typically signaled at the CU level whether prediction error coding is applied or not for each CU. In the case there is no prediction error residual associated with the CU, it can be considered there are no TUs for that same CU. The division of the image into CUs, and the division of CUs into PUs and Tus, is typically signaled in the bitstream transmitting the video (or stored with the video if encoded video is put into a computer readable memory), which allows the decoder to reproduce the intended structure of these units.

Figure 2:
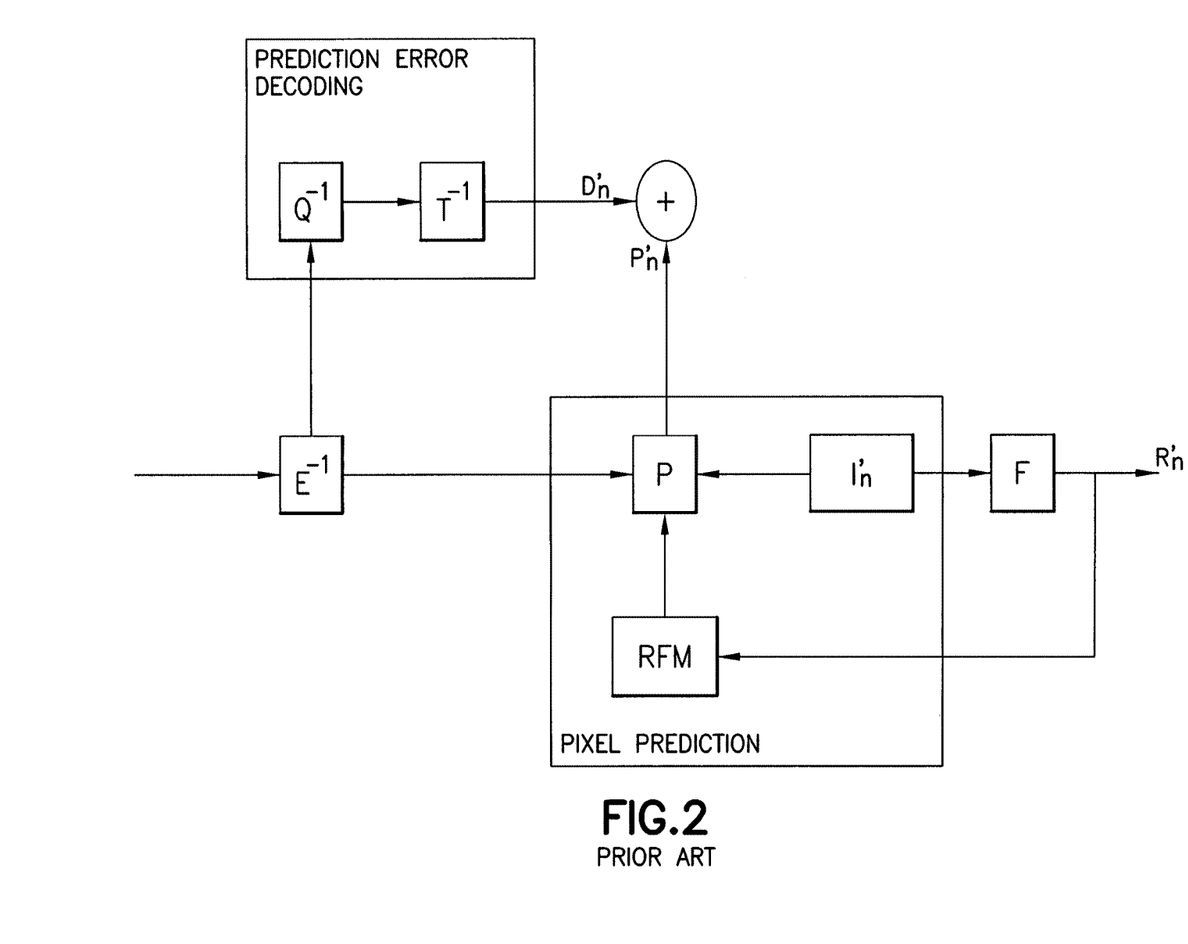
FIG. 2 is a schematic block diagram of a generic video decoder for decoding the video encoded by the process of FIG. 1, as is known in the video coding arts.

FIG. 2 is a schematic block diagram of a generic video decoder for decoding the video encoded by the FIG. 1 process, and FIG. 2 uses the following representations:

P'$_n$ Predicted representation of an image block
D' Reconstructed prediction error signal
I'$_n$ Preliminary reconstructed image
R'$_n$ Final reconstructed image
T$^{-1}$ Inverse transform
Q$^{-1}$ Inverse quantization
E$^{-1}$ Entropy decoding
RFM Reference frame memory
Prediction (either inter or intra)
F Filtering The decoder reconstructs the output video by applying prediction means similar to the encoder to form a predicted representation of the pixel blocks using the motion or spatial information created by the encoder and stored in the compressed representation, and using prediction error decoding which is the inverse operation of the prediction error coding to recover the quantized prediction error signal in the spatial pixel domain. After applying prediction and prediction error decoding means the decoder sums up the prediction and prediction error signals (the pixel values) to form the output video frame. The decoder of FIG. 2 as well as the encoder of FIG. 1 can also apply additional filtering means to improve the quality of the output video before passing it for display and/or storing it as a prediction reference for the forthcoming frames in the video sequence.

Instead of or in addition to approaches utilizing sample value prediction and transform coding for indicating the coded sample values, a color palette based coding can be used. Palette based coding refers to a family of approaches for which a palette is defined, typically as a set of colors and associated indexes, and the value for each sample within a coding unit is expressed by indicating its index in the palette. Palette based coding can achieve good coding efficiency in coding units with a relatively small number of colors, such as for example image areas which are representing computer screen content that includes only text and/or simple graphics. In order to improve the coding efficiency of palette coding, different kinds of palette index prediction approaches can be utilized, or the palette indexes can be run-length coded to be able to represent larger homogenous image areas efficiently. Also, escape coding can be utilized for the case in which the CU contains sample values that are not recurring within the CU. Escape coded samples are transmitted without referring to any of the palette indexes; Instead their values are indicated individually for each escape coded sample.

In typical video codecs the motion information is indicated with motion vectors associated with each motion compensated image block. Each of these motion vectors represents the displacement of the image block in the picture to be coded or decoded (at the respective encoder and decoder sides) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of a previously coded/decoded picture can be predicted. The reference index is typically predicted from adjacent blocks and/or or co-located blocks in a temporal reference picture. Moreover, typical high efficiency video codecs can employ an additional motion information coding/decoding mechanism, often called merging (sometimes referred to as merge mode) where all the motion field information, which includes motion vector and corresponding reference picture index for each available reference picture list, is predicted and used without any modification or correction. Similarly, predicting the motion field information is carried out using the motion field information of adjacent blocks and/or co-located blocks in temporal reference pictures and the used motion field information is signaled among a list of motion field candidates filled with motion field information of available adjacent/co-located blocks.

Typically video codecs support motion compensated prediction from one source image (uni-prediction) or from two sources (bi-prediction). In the case of uni-prediction a single motion vector is applied whereas in the case of bi-prediction two motion vectors are signaled and the motion compensated predictions from the two sources are averaged to create the final sample prediction. In the case of weighted prediction the relative weights of the two predictions can be adjusted, or a signaled offset can be added to the prediction signal.

In addition to applying motion compensation for inter picture prediction, a similar approach can be applied to intra picture prediction. In this case the displacement vector indicates where from the same picture a block of samples can be copied to form a prediction of the block to be coded or decoded. This kind of intra block copying methods can improve the coding efficiency substantially in the presence of repeating structures within the frame such as text or other graphics.

In typical video codecs the prediction residual after motion compensation or intra prediction is first transformed with a transform kernel such as DCT and then coded. The reason for this is that often there still exists some correlation among the residual and the transform kernal can in many cases help reduce this correlation and provide more efficient coding.

Typical video encoders utilize Lagrangian cost functions to find optimal coding modes, for example the desired Macroblock mode and its associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R \qquad \text{(Eq. 1)}$$

where: C is the Lagrangian cost to be minimized;
D is the image distortion (for example, Mean Squared Error) with the mode and motion vectors considered; and
R is the number of bits needed to represent the required data to reconstruct the image block in the decoder (including the amount of data to represent the candidate motion vectors).

Scalable video coding refers to a coding structure where one bitstream can contain multiple representations of the content at different bitrates, resolutions or frame rates. In these cases the receiver can extract the desired representation depending on its characteristics, for example resolution that matches the best of which the display device is capable). Alternatively, a server or a network element can extract the portions of the bitstream to be transmitted to the receiver, depending for example on the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers; for example the motion and mode information of the enhancement layer can be predicted from lower layers. Similarly the pixel data of the lower layers can be used to create prediction for the enhancement layer.

A scalable video codec for quality scalability (also known as Signal-to-Noise Ratio or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use, typically with a reference picture index in the coded bitstream. The decoder decodes from the bitstream, for example from a reference picture index, that a base-layer picture is used as an inter prediction reference for the enhancement layer. When a decoded base-layer picture is used as a prediction reference for an enhancement layer, it is referred to as an inter-layer reference picture.

In addition to quality scalability following scalability modes exist:
Spatial scalability: Base layer pictures are coded at a higher resolution than enhancement layer pictures.
Bit-depth scalability: Base layer pictures are coded at lower bit-depth (e.g. 8 bits) than enhancement layer pictures (e.g. 10 or 12 bits).
Chroma format scalability: Base layer pictures provide higher fidelity in chroma (e.g. coded in 4:4:4 chroma format) than enhancement layer pictures (e.g. 4:2:0 format).

In all of the above scalability cases, the base layer information could be used to code the enhancement layer in order to minimize the additional bitrate overhead.

Scalability can be enabled in two basic ways; either by introducing new coding modes for performing prediction of pixel values or syntax from lower layers of the scalable representation, or by placing the lower layer pictures to the reference picture buffer (which is termed a decoded picture buffer, DPB) of the higher layer. The first approach is more flexible and thus can provide better coding efficiency in most cases. However the second approach, reference frame based scalability, can be implemented very efficiently with minimal changes to single layer codecs while still achieving a majority of the coding efficiency gains available. Essentially a reference frame based scalability codec can be implemented by utilizing the same hardware or software implementation for all the layers, just taking care of the DPB management by external means.

But as mentioned in the background section above conventional spatial intra prediction does not predict some common classes of textures very well, and directional sample prediction sometimes aligns the prediction error with the selected prediction direction. It is these aspects in which advantages of the encoding/decoding techniques described herein are most pronounced.

In one aspect of these teachings the predicted sample values are modified in the direction of prediction, which allows the codec to compensate for more complex textures than traditional methods. This modification is enabled by what we term a "helper indication", and from it can be determined for example a linear change in the predicted sample values when moving one sample row or column further away from the reference sample row or column. FIGS. 3C-D illustrate some example prediction helpers.

In another aspect of these teachings there is a modification to the prediction error coding to optimize for the improved prediction performance, while also avoiding redundancy in the signaling of prediction error information. This can be achieved, for example, by switching positions of one or more lines of transform coefficients in the residual coding phase. In one particular embodiment below the intra prediction helper information can be embedded in the coded prediction error signal.

Consider one particular embodiment from the perspective of the decoder side. In this case the decoder reconstructs the intended prediction signal (or a prediction sample block) by performing the following steps:
1. Receive an indication of a prediction mode;
2. Receive an indication of one or more intra prediction helper values; and
3. Calculate a predicted value for a sample based on said indication of the prediction mode and said indication of the one or more helper values.

4. Optionally the decoder can also receive an indication of prediction error and apply prediction error coding or decoding means based on said indication of the one or more helper values.

In this particular embodiment there can be one helper value h(x) for each column in the prediction block (in the case of vertical prediction modes) and one helper value h(y) for each row in the prediction block (in the case of horizontal prediction modes). The helper values h(x) or h(y) are quantized and coded in the bitstream using entropy coding means. The helper values are applied linearly and the helper values are accumulated to the reference samples r(x) and r(y) in the direction of prediction.

In the case of directly vertical prediction the predicted sample values p(x, y) can be represented as:

$$p(x,y)=r(x)+y*h(x) \tag{Eq. 2}$$

In the more generic case the predicted sample values p(x, y) can be represented as:

$$p(x,y)=a_y*r(x+n_y)+(1-a_y)*r(x+n_y+1)+y*(a_y*h(x+n_y)+(1-a_y)*h(x+n_y+1)) \tag{Eq. 3}$$

where: $n_y$ is an integer; and
$a_y$ describes the fractional part of the reference sample when predicting sample row y (defined based on the selected prediction direction, for example as specified in the H.265/HEVC standard).

FIGS. 3A-D illustrate reference samples r1, r2, r3 and r4 along the topmost (shaded) row of each, and a prediction block that includes prediction samples in the remaining unshaded rows apart from the reference samples. For simplicity of explanation these examples assume a prediction direction that is directly vertical; that is, each prediction block references only another reference sample in the same column. In other embodiments a given prediction block can reference a reference sample in a different row, in a different column, or multiple reference samples in the same or different rows and/or columns. The shaded lefthand column also includes reference samples apart from r0 in the un-labelled shaded boxes, but in these examples they are not used as a reference for any of the prediction block and so are un-labeled.

Figure 3A:
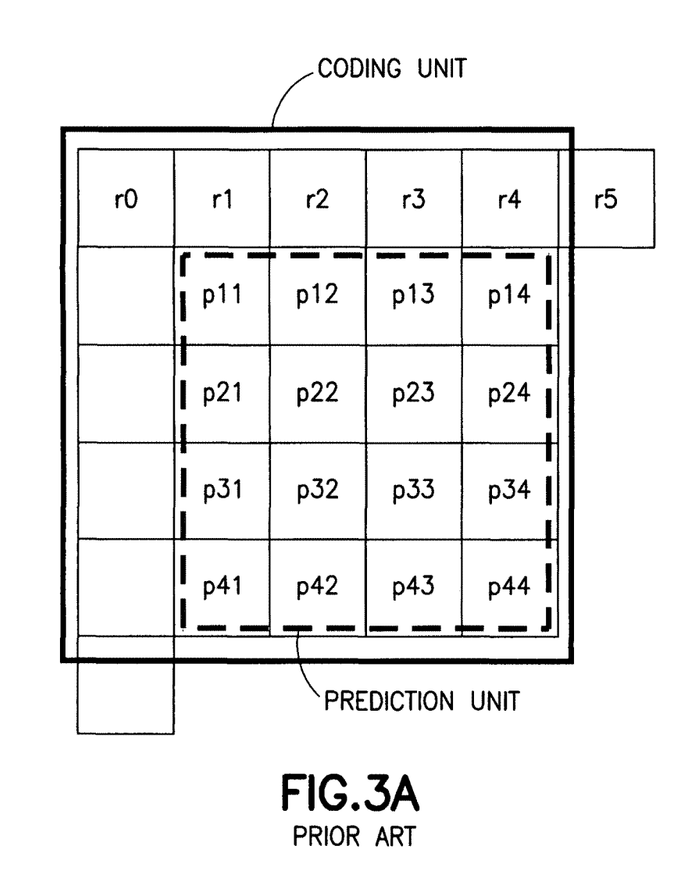
FIG. 3A illustrates a convention used in FIGS. 3B-D for sample locations of a prediction block corresponding to a reference sample in a control unit using a vertical-only prediction direction.

Generally the heavily-lined box of FIG. 3A may be considered a CU, and the dashed-line box within it may be considered a PU for that same CU. For FIGS. 3B-D assume the same reference samples r1-r4, CU and PU as is shown for FIG. 3A. The individual boxes/samples within the PU are each uniquely identified in FIGS. 3B-D using the same designations p11, p12, p21, etc. that are shown in FIG. 3A.

Figure 3B:
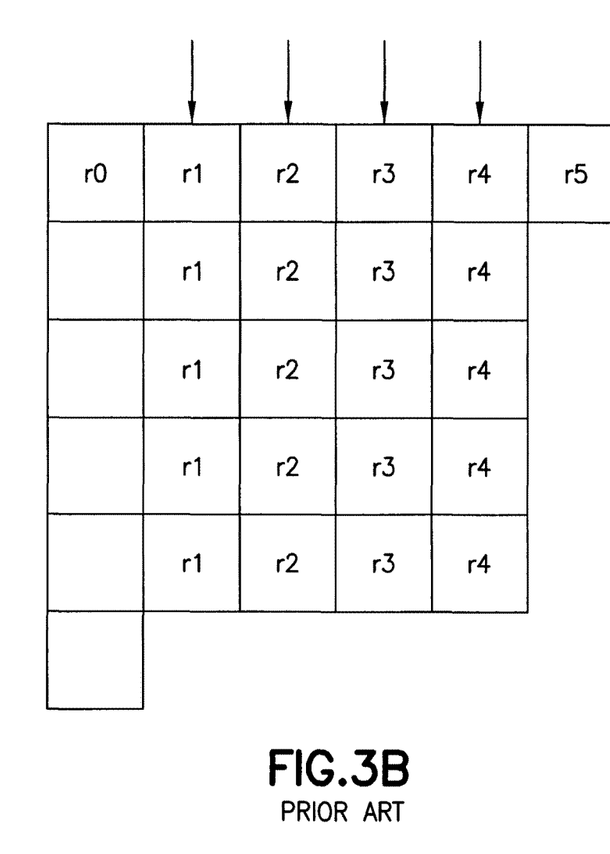
FIG. 3B is a control unit with one prediction unit using the convention of FIG. 3A for illustrating a conventional approach to predicting sample values.
Figure 3C:
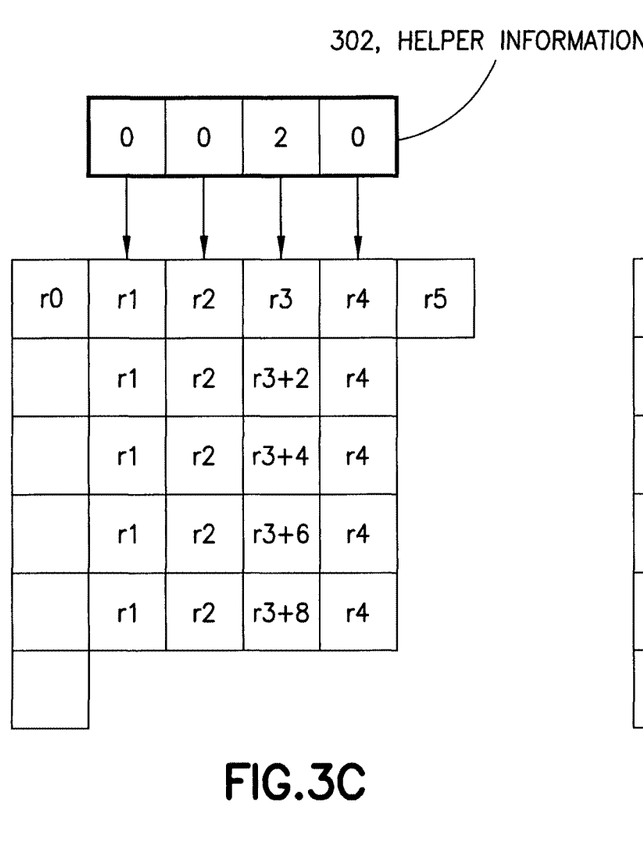
FIG. 3C is a control unit with one prediction unit using the convention of FIG. 3A for illustrating one example for linearly predicting sample values according to these teachings.
Figure 3D:
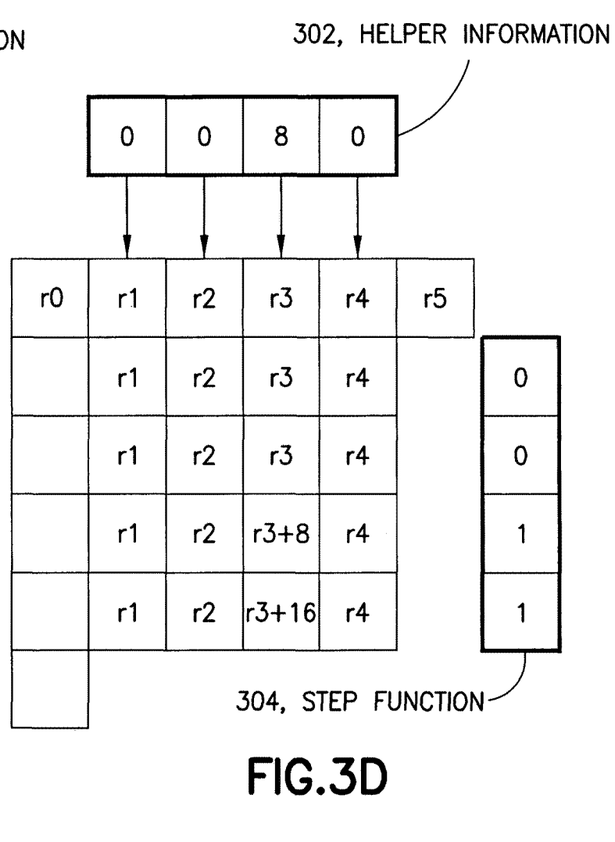
FIG. 3D is a control unit with one prediction unit using the convention of FIG. 3A for illustrating one example for non-linearly predicting sample values according to these teachings.

The designations p11, p12, p21, etc. shown in FIG. 3A may be considered to represent the prediction vectors, which will take in different values for FIGS. 3B-D. The predicted samples within the prediction block/PU are generated by directionally copying the reference samples that are indicated by the prediction vectors into the box that bears the prediction vector value. FIG. 3B represents the prior art vertical directional intra prediction while FIGS. 3C-D illustrate two simple embodiments of these teachings for vertical directional intra prediction. In other embodiments the prediction vectors can reference one or more reference samples in a different CU of this same image frame (still intra prediction), or in a CU of a different frame (inter prediction).

First consider the prior art approach that FIG. 3B represents. In the column in which reference sample r1 lay, each and every prediction vector p11, p21, p31 and p41 points to the box immediately above it in the same vertical column, as they must given the constraint of this simple example for directly vertical directional prediction. The prediction vector p11 points to reference sample r1 and so r1 is copied to the box designated as p11. The prediction vector p21 points to the box directly above it designated as p11, which now in the decoding process has a copy of the reference sample r1, and so reference sample r1 is again copied into the box designated as p21. The prediction vector p31 points to the box directly above it and similarly copies the reference sample r1 into the box designated as p31, and so forth for the column under reference sample r1. The other columns are similar for their respective reference samples r2, r3 and r4, such that each row of the prediction block/PU (the unshaded portion) in FIG. 3B becomes a copy of the reference samples r1-r4 in the topmost row. Because this example is restricted to a vertical-only prediction direction, the necessary result of the conventional HEVC coding/decoding is that the reference samples are repeated exactly in the same column across all rows of the prediction block as FIG. 3B shows. This illustrates the directional bias in the prediction processes of conventional video coding/decoding.

FIG. 3C illustrates an example where a linear prediction helper (generally, helper information 302) of magnitude +2 is signaled for the column aligned with reference sample r3 (third prediction column). There is no non-zero prediction helper value in the other columns of the helper information 302 for FIG. 3C so those columns after decoding are identical to the corresponding columns of FIG. 3B. But the non-zero helper value for the third prediction column adds +2 to the value of the block immediately above. Assuming as one specific example that the prediction vectors refer to samples above the block and the relevant value at reference sample r3 is 87, then the third prediction row for FIG. 3C will be decoded as follows:

| Location | Value at reference location | Value for current location |
|---|---|---|
| Reference sample r3 | N/A | 87 |
| Prediction block p13 | 87 | 89 |
| Prediction block p23 | 89 | 91 |
| Prediction block p33 | 91 | 93 |
| Prediction block p43 | 93 | 95 |

Each subsequent row in the third prediction column for FIG. 3C has a value that diverges by the helper value +2 from the corresponding value in the row immediately above. In one specific example the sample values are pixel colors or indices of a color palette, but in other implementations these sample values can represent any of a variety of parameters that define a digital image.

Now consider the FIG. 3D example, similar to FIG. 3C in that the only non-zero helper value 302 is for the third prediction column. But in the case of FIG. 3D the helper information 302 has a magnitude +8, and more distinctively from FIG. 3C the helper information 302 for FIG. 3D was generated by a step function 304 [0, 0, 1, 1]. In this specific example the step function is used to modulate the helper signal 302 with a result of active helpers only present for the last two samples in the selected column. Specifically, the first two zeros of the step function 304 negate the +8 helper value for the locations p13 and p23 of the prediction block/PU at FIG. 3D, and so in these locations the reference sample r3 is copied without alteration. The second two values of the step function 304 are unity multipliers of the helper value +8 for the locations p33 and p43 of the prediction block/PU at FIG. 3D, and so in each of these locations the magnitude +8 of the helper value is added to the magnitude of the sample this vector refers to. Continuing the assumption of FIG. 3C that the prediction vectors refer to samples above the block and the relevant value at reference sample r3 is 87, then the third prediction row for FIG. 3D will be decoded as follows:

| Location | Value at reference location | Value for current location |
| --- | --- | --- |
| Reference sample r3 | N/A | 87 |
| Prediction block p13 | 87 | 87 |
| Prediction block p23 | 87 | 87 |
| Prediction block p33 | 87 | 95 |
| Prediction block p43 | 95 | 103 |

The encoder decides the helper values, and in doing so may balance the sample prediction improvement against the increased bitrate needed to signal the helper values. The step function can be decided by the encoder also or it can be defined external of the encoder/decoder apparatuses (for example, a given codec an always use a pre-defined step function, which the encoder can override by signaling a different step function to be applied by the decoder for only for a given PU, a given frame or for the entire video stream). Anytime the encoder decides a step function it should be signaled in the encoded bitstream so the decoder can properly decode the image frames. In practice the manner in which the step function is applied may differ from the examples above so long as both encoder and decoder have a common understanding of how it is to be applied. In the above examples one box/prediction block referred to the prediction block or reference sample immediately above it and so for prediction block p43 the step function [0,0,1,1] for FIG. 3D added the helper value +8 to the value of prediction block p33. But in other conventions the encoder and decoder can understand the prediction vector pointing to the original reference sample, in which case the same step function and helper value used for FIG. 3D would yield [87, 87, 95, 95] for column 3 since for p43 the +8 helper value would be added to the value 87 of reference sample r3, as opposed to being added to the value 95 of prediction block p33.

Comparing FIGS. 3A, 3B and 3D for this example and assuming vertical-only prediction direction, the conventional coding of FIG. 3A allows no color gradient within a column of a PU, the helper information enables a continuous color gradient within a given column and the helper information in combination with the step function enables a discontinuous color gradient within a given column of a PU. The same holds true for a horizontal-only prediction direction. For combinations of vertical and horizontal, the conventional practice can choose for a given PU location only one reference pixel of the CU and so this is still a directional bias in some respects, and so the benefits of coding using helper information (with or without step functions) greatly mitigate the directional bias in conventional video coding. This is true even without the artificial constraint of vertical-only prediction direction that was used in the above examples for simplicity of explanation.

There are various implementations for embodying these teachings. For example, there are various ways to indicate the prediction mode which gives the prediction direction (e.g., vertical, horizontal, or combined/merge mode if two reference samples are used for one prediction sample). While the examples at FIGS. 3C-D used helper values in sets of 4 of which only one helper value was non-zero, that was for simplicity of explanation and to match the 4*4 PU size; in other embodiments the number of helper values can vary from those examples and can depend on different aspects such as the prediction direction (e.g., 2 helper values can be used for one sample if that sample vector points to a horizontal reference sample and to a vertical reference sample, or if that sample vector points to a reference location in between two reference samples and the predicted sample value is generated using values of both those reference samples) and the prediction block/PU size.

There are also a wide variety of ways in which the helper values can be indicated. As some non-limiting examples, they can be indicated as absolute values, or as differential values with respect to predicted sample values as in the FIG. 3C-D examples above, or other helper values such as a variable the encoder and decoder use in a predetermined algorithm (e.g., a mod function on the indicated helper value). In any of these examples the absolute or differential helper values can be coded separately, or they can be coded jointly. In the case of joint coding the absolute or differential helper values can be transform coded using one or more transforms, such as for example DCT, DST or Haar (wavelet) transform. The absolute or differential helper values can be quantized at the encoder and de-quantized at the decoder using various approaches, for example scalar quantization of transformed or non-transformed values. The granularity of the quantization and de-quantization can be indicated explicitly with the video stream, or it can be derived from other coding parameters such as for example quantization parameters used in prediction error coding. And of course combinations of the above can also be used in still different implementations.

Prediction helper values can be applied either linearly adding a constantly increasing value for the predicted samples in the direction of prediction as shown in the FIG. 3C example, or non-linearly adding a value that can be different from one processing line to another as in the FIG. 3D example. In the case of non-linear operation the values for each processing line can be pre-determined or signaled in the bitstream carrying the encoded video.

Prediction helper values can indicate how much the predicted sample value on the last row of a block should be modified, or it can indicate how much the predicted sample value on some other row (such as the first row) should be modified. In the above examples only the third column of a prediction block/PU was modified by a prediction helper value but if for example the same prediction helper set 302 were signaled with an indication of horizontal prediction direction mode then the +2 or +8 values would be applied to the third row of the illustrated PU.

Prediction helper values may be indicated for some or all reference samples used in the prediction process, or prediction helper values may be indicated for only some pixels within the prediction block as was the case for the FIGS. 3C and 3D examples above. In the case prediction helper values are indicated for some pixels within the prediction block, those helper values may be projected to the reference sample row and used as those were indicated for the reference samples.

Statistics of the neighboring pixels can also be used to code the prediction helper values, and/or to code how the prediction helper values are to be applied to improve the prediction (e.g., to encode the step function). As an example, the neighboring pixels or prediction helper values associated with neighboring pixels can be used to define the context used in context adaptive arithmetic coding of the prediction helper values. In some cases the prediction helper values can also be inferred from the neighboring pixel values, or calculated using the neighboring pixel values (e.g. considering the local changes in the sample values in the pixel neighborhood).

In a practical deployment of these teachings it may be that in the presence of prediction helper values the residual coding operations may be different from the residual coding operations that are used when there are no prediction helper values associated with the block of samples. In this regard one example of such a difference is that the transform coefficient coding can be adapted. One possibility to adapt the transform coding is to scan the coefficients in a different order or to switch positions of some or all the transform coefficients within the transform block. For example, if a DST type of transform is used in prediction error coding and horizontal prediction with prediction helper values is selected, the magnitudes of the coefficients in the first column of the forward transform output are likely to become small, and in this case that column of coefficients may be moved to the last column prior to entropy coding the coefficients. Another example of adapting the transform coding is to specify dedicated contexts used in arithmetic coding of the transform coefficients when intra prediction helper values are present.

One particularly advantageous way to indicate the prediction helper values is to embed them into the prediction error signaling. For example, some of the transform coefficients can be used to store the prediction helper values instead of a weight of a certain basis function. In this case one or more of the actual transform coefficients (e.g. transform coefficients associated with the first basis functions of DST in either the horizontal or vertical direction) can be set to zero and the values of the prediction helpers in the related direction can be passed to the coefficient coding process. Similarly on the decoder side the decoded values typically associated with certain transform coefficients can be assigned as values for the intra prediction helpers whereas the related transform coefficients can be set to zero. In an alternative example the number of coefficients encoded or decoded can be increased from the number required by the transform itself so as to include also the ultra prediction helper values as additional coefficients.

Embodiments of these teachings can improve the accuracy of the spatial intra prediction in video and image processing. Some of the implementation alternatives may require a small amount of additional processing as compared to traditional intra prediction techniques but for most implementations this should not be substantially limiting; dedicated image/video processors have become quite common in consumer devices and are even present in many mobile devices such as the latest smartphones for which battery consumption has become a less significant problem despite greater capabilities and higher volumes of data processing (including image/video processing).

Figure 4:
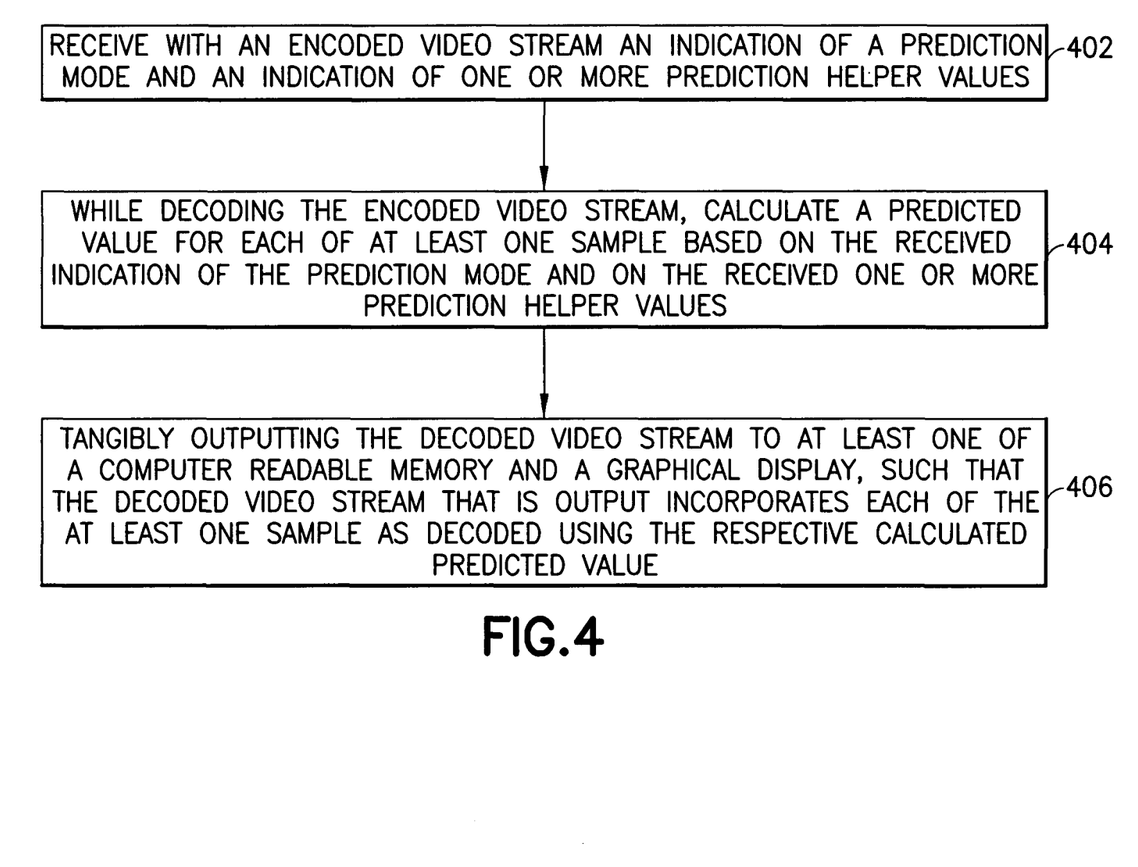
FIG. 4 is a process flow diagram according to an example embodiment of these teachings.

FIG. 4 is a process flow diagram that summarizes some of the above aspects for decoding a video stream from the perspective of the decoder. In other embodiments these same teachings can be used for decoding individual images that are encoded when stored or transmitted, but greater advantages are seen in utilizing these teachings for the images in a video stream rather than individual images/pictures. Firstly at block 402 the decoder performing the method of FIG. 4 receives an encoded video stream with also an indication of a prediction mode and an indication of one or more prediction helper values. While decoding the encoded video stream at block 404 the decoder calculates a predicted value for each of at least one sample, and this predicted value is calculated based on the received indication of the prediction mode and on the received one or more prediction helper values. Then at block 406 the decoder tangibly outputs the decoded video stream to at least one of a computer readable memory and a graphical display, such that the decoded video stream that is output incorporates each of the at least one sample as decoded using the respective calculated predicted value.

In the above examples the prediction mode that is indicated at block 402 could be a vertical prediction mode as in the FIG. 3C-D examples, a horizontal prediction mode, a combined vertical and horizontal prediction mode such as where a single sample refers to two different reference samples, a merge mode such as Macroblock in which there is motion information, a scalable mode such as where the encoded video stream includes a base layer and at least one enhancement layer, and also a direct current mode and a planar mode as in the HEVC standard.

In any of these above embodiments, decoding the encoded video stream as in block 404 may include, for each said sample having a corresponding non-zero prediction helper value, calculating the predicted value as in block 404 is done by applying the predicted helper value to a corresponding value of a reference sample that is located along a prediction direction relative to said sample, where the prediction direction is given by the prediction mode. In the FIG. 3C-D examples r3 was in the position of such a reference sample.

Further for any of the above embodiments, the indication of the one or more prediction helper values from block 402 can be indicated in sets of prediction helper values as explained with respect to FIGS. 3C-D which each had only one such set, where each such set corresponds to one prediction unit PU of a coding unit CU within the encoded video stream. In FIG. 3C-D the CU and the PU it includes were within one image/frame of that video stream.

The example from FIG. 3D showed that for at least one of the sets in such a video stream the predicted values for at least two samples of the set in a same row or same column of the prediction unit are non-linear due to applying a step function to a common prediction helper value when calculating the predicted values for the same row or same column in which lay the at least two samples. In this case +8 was the common prediction helper value.

The example from FIG. 3C showed that for each other set for which no step function is used when calculating the predicted values, for a given row or column of the prediction block corresponding to a non-zero prediction helper value the calculated predicted values accumulate linearly in the direction of prediction by the corresponding non-zero prediction helper value. In the FIG. 3C example the amount of the linear accumulation was +2 per each sequential row of the PU.

While these techniques can also be used for inter prediction, the FIG. 3C-D examples were such that the prediction helper values were restricted to only intra prediction in which the sample and a reference sample are in a same image frame of the decoded video stream. And also for the FIG. 3C-D examples it was stated that each of the samples p11, p12, p21, etc. was a pixel and the respective prediction helper value indicated an offset value modifying the samples predicted using a reference sample (which was r3 in FIGS. 3C-D). However, a prediction helper value can also indicate a respective index of a color palette for coloring the respective pixel as compared to another index of the color palette for coloring a corresponding reference pixel. This is not to say the helper value itself needs to be a palette color index; while it is a possible implementation that the indicated helper value is an absolute value corresponding to a palette index, the value of the prediction helper can be used as an offset to the palette index actually used in the reference sample 63, and in this way the offset 'indicated' the respective index when taken relative to the index of the reference sample r3.

It is noted that while the description above assumes a transmission of the video stream since streaming video is becoming more ubiquitous and transmitted video sometimes requires a greater level of compression (and thus more encoding) than might be used when only storing the video on a computer readable memory, when video is encoded according to these teachings it would be stored with the indications mentioned at block 402 of FIG. 4 same as if the video were transmitted with them. This is so the decoder can use those same indications regardless of whether the decoder receives the encoded video over a transmission channel (wired or wireless) or reads it from a memory stick that a user plugs into some host device (laptop computer; camera/media playback device; smartphone; etc.) that includes the decoder.

An encoder operating according to these teachings may perform the same steps shown at FIG. 4 essentially in reverse, namely, it could obtain a video stream such as a live-recorded stream from a camera in place of block 406, then while encoding that video stream it calculates for one or more prediction samples a prediction value using a prediction direction and one or more prediction helper values in place of block 404, and then it can output the encoded video stream to a memory or to a radio for transmission along with an indication of the prediction mode that defines the prediction direction and one or more indications of the prediction helper value(s) in place of block 402.

Figure 5:
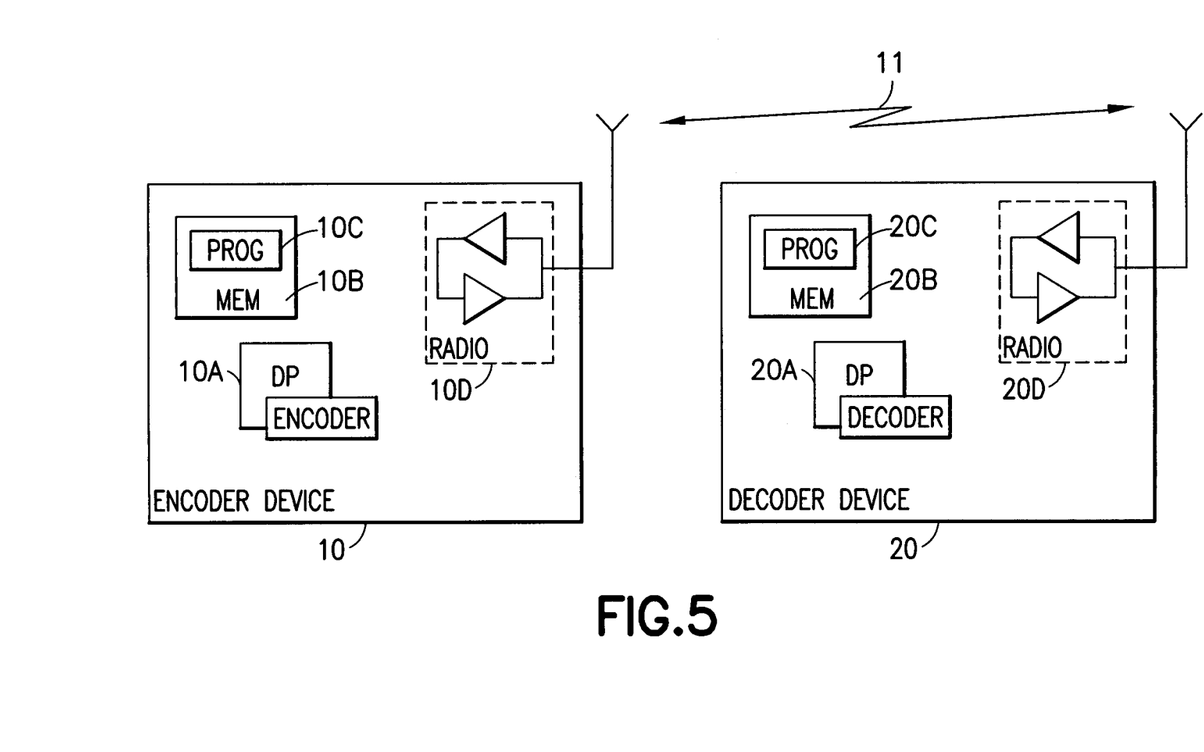
FIG. 5 is a high level schematic block diagram illustrating certain apparatus/devices that are suitable for encoding and decoding a video stream practicing according to certain aspects of these teachings.

FIG. 5 is a schematic diagram illustrating some components of generic host devices for encoding and decoding a video stream according to these teachings, named an encoder device 10 and a decoder device 20. While a wireless channel 11 is shown between them for transmitting and receiving the encoded video stream, that encoded video stream can be transferred from encoder device 10 to decoder device 20 via a physical memory such as a removable memory card or stick, or there may be one device such as a camera with a graphical display interface that records the video, encodes it when it saves the recorded video to the memory, and decodes it when accessing the encoded video from the memory for playback on the graphical display. There may also be an intermediate device such that the encoder device 10 records and encodes the video, provides it to the intermediate device such as a server or other central database that may store and index the encoded video within a larger video library, and the intermediate device provides the encoded video to the decoder device 20 such as an individual's laptop computer, smartphone, vehicle-mounted video display device, or the like.

The encoder device 10 includes a controller, such as a computer or a data processor (DP) 10D, a computer-readable memory medium embodied as a memory (MEM) 10B that stores a program of computer instructions (PROG) 10C, and it may also have a suitable wireless interface such as radio frequency (RF) transmitter/receiver combination 10D for bidirectional wireless communications with the decoder device 20 or the intermediate device via one or more antennas. The encoder processing may be done by a separate DP as shown, or by the main central processing DP 10A, or some combination of both processing chips or more than only those two.

The wireless link between the encoder device 10 and the decoder device 20 can be direct as shown, or through an intermediate device such as a server on the Internet as described above, or as also mentioned there may be no wireless link for communicating the encoded video if either the encoded video is transferred between different devices 10, 20 via a removable memory or if the encoder device 10 and the decoder device 20 are the same device in which the encoded video is stored in the memory until decoded when it is to be played back at a graphical user interface such as a graphical display or a projector.

The decoder device 20 also includes a controller, such as a computer or a data processor (DP) 20A, a computer-readable memory medium embodied as a memory (MEM) 20B that stores a program of computer instructions (PROG) 20C, and it also may have a suitable wireless interface, such as RF transmitter/receiver combination 20D for communication with the encoder device 10 via one or more antennas. Similar to the encoder processing, the decoder processing may be done by a separate DP as shown, or by the main central processing DP 20A, or some combination of both processing chips or more than only those two.

At least one of the PROGs 10C/20C is assumed to include program instructions that, when executed by the associated DP 10A/20A, enable the device to operate in accordance with exemplary embodiments of this invention as detailed above. That is, various exemplary embodiments of this invention may be implemented at least in part by computer software executable by the DP 10A of the encoder device 10; by the DP 20A of the decoder device 20, or by hardware or by a combination of software and hardware (and firmware).

The computer readable MEMs 10B/20B may be of any type suitable to the local technical environment and may be implemented using any one or more suitable data storage technology, such as semiconductor based memory devices, flash memory, magnetic memory devices and systems, optical memory devices and systems, fixed memory and removable memory, electromagnetic, infrared, or semiconductor systems. Following is a non-exhaustive list of more specific examples of the computer readable storage medium/memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The DPs 10A/20A may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., the radios 10D/20D) may be of any type suitable to the local technical environment and may be implemented using any suitable communication technology such as individual transmitters, receivers, transceivers or a combination of such components.

In general, the various embodiments of the encoder device 10 and/or the decoder device 20 can include, but are not limited to, smart phones with cameras and/or graphical displays, machine-to-machine (M2M) communication devices, cellular telephones, personal digital assistants (PDAs) having video recording and/or playback capabilities, portable computers having video recording and/or playback capabilities, image capture devices such as digital cameras having video recording and/or playback capabilities, gaming devices having video recording and/or playback capabilities, music storage and playback appliances having video recording and/or playback capabilities, Internet appliances permitting video recording and/or playback capabilities, as well as portable units or terminals that incorporate combinations of such functions. Any of these may be embodied as a hand-portable device, a wearable device, a device that is implanted in whole or in part, a vehicle-mounted communication device, and the like.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into an embodiment that is not specifically detailed herein as separate from the others. Accordingly, the description is intended to embrace all such alternatives, modifications and variances which fall within the scope of the appended claims.

The following abbreviations that may be found in the specification and/or the drawing figures are defined as follows. These terms are used consistent with their ordinary meaning, as set forth in the H.265/HEVC standard of ITU-T.

AC Alternating Current (coefficient of the DCT)
AVC Advanced Video Coding (H.264/AVC standard)
CTU Coding Tree Unit
CU Coding Unit
DCT Discrete Cosine Transform
DPB Decoded Picture Buffer
DST Discrete Sine Transform
DC Direct Current (coefficient of the DCT)
HEVC High Efficiency Video Coding (H.265/HEVC standard)
LCU Largest Coding Unit
ITU-T International Telecommunication Union-Telecommunication Standardization sector
MVC Multi-view Video Coding
MVP Motion Vector Prediction
PU Prediction Unit
SNR Signal to Noise ratio
SVC Scalable Video Coding
TU Transform Unit

What is claimed is:

1. A method for decoding a video stream, the method comprising:
   receiving with an encoded video stream an indication of a prediction mode and an indication of one or more prediction helper values;
   while decoding the encoded video stream, calculating a predicted value for each of at least one sample based on the received indication of the prediction mode and on the received one or more prediction helper values, wherein for each said sample having a corresponding non-zero prediction helper value the predicted value is calculated by applying the predicted helper value to a corresponding value of a reference sample that is located along a prediction direction relative to said sample, where the prediction direction is given by the prediction mode; and
   tangibly outputting the decoded video stream to at least one of a computer readable memory and a graphical display, such that the decoded video stream that is output incorporates each of the at least one sample as decoded using the respective calculated predicted value.

2. The method according to claim 1, wherein the indication of the prediction mode indicates at least one of: vertical prediction mode, horizontal prediction mode, combined vertical and horizontal prediction mode, merge mode, scalable mode in which the encoded video stream comprises a base layer and at least one enhancement layer, direct current mode, and planar mode.

3. The method according to claim 1, wherein the indication of the one or more prediction helper values are indicated in sets of prediction helper values, each set corresponding to one prediction unit of a coding unit within the encoded video stream.

4. The method according to claim 3, wherein for at least one of the sets the predicted values for at least two samples of the set in a same row or same column of the prediction unit are non-linear due to applying a step function to a common prediction helper value when calculating the predicted values for the same row or same column in which lay the at least two samples.

5. The method according to claim 4, wherein for each other set for which no step function is used when calculating the predicted values, for a given row or column of the prediction block corresponding to a non-zero prediction helper value the calculated predicted values accumulate linearly in the direction of prediction by the corresponding non-zero prediction helper value.

6. The method according to claim 1, wherein the prediction helper values are restricted to only intra prediction in which the sample and a reference sample are in a same image frame of the decoded video stream.

7. The method according to claim 1, wherein each of the at least one samples is a pixel and the respective prediction helper value indicates a respective index of a color palette for coloring the respective pixel as compared to another index of the color palette for coloring a corresponding reference pixel.

8. An apparatus for decoding a video stream, the apparatus comprising:
   at least one computer readable memory storing computer program instructions; and
   at least one processor;
   wherein the computer readable memory with the computer program instructions is configured, with the at least one processor, to cause the apparatus to at least:
   receive with an encoded video stream an indication of a prediction mode and an indication of one or more prediction helper values;
   while decoding the encoded video stream, calculate a predicted value for each of at least one sample based on the received indication of the prediction mode and on the received one or more prediction helper values, wherein for each said sample having a corresponding non-zero prediction helper value the predicted value is calculated by applying the predicted helper value to a corresponding value of a reference sample that is located along a prediction direction relative to said sample, where the prediction direction is given by the prediction mode; and
   output the decoded video stream to at least one of a computer readable memory and a graphical display, such that the decoded video stream that is output incorporates each of the at least one sample as decoded using the respective calculated predicted value.

9. The apparatus according to claim 8, wherein the indication of the prediction mode indicates at least one of: vertical prediction mode, horizontal prediction mode, combined vertical and horizontal prediction mode, merge mode, scalable mode in which the encoded video stream comprises a base layer and at least one enhancement layer, direct current mode, and planar mode.

10. The apparatus according to claim 8, wherein the indication of the one or more prediction helper values are indicated in sets of prediction helper values, each set corresponding to one prediction unit of a coding unit within the encoded video stream.

11. The apparatus according to claim 10, wherein for at least one of the sets the predicted values for at least two samples of the set in a same row or same column of the prediction unit are non-linear due to applying a step function to a common prediction helper value when calculating the predicted values for the same row or same column in which lay the at least two samples.

12. The apparatus according to claim 11, wherein for each other set for which no step function is used when calculating the predicted values, for a given row or column of the prediction block corresponding to a non-zero prediction helper value the calculated predicted values accumulate linearly in the direction of prediction by the corresponding non-zero prediction helper value.

13. The apparatus according to claim 8, wherein the prediction helper values are restricted to only intra prediction in which the sample and a reference sample are in a same image frame of the decoded video stream.

14. The apparatus according to claim 8, wherein each of the at least one samples is a pixel and the respective prediction helper value indicates a respective index of a color palette for coloring the respective pixel as compared to another index of the color palette for coloring a corresponding reference pixel.

15. A computer readable memory storing computer program instructions that, when executed by one or more processors, cause a host decoder device to perform actions directed to decoding a video stream, the actions comprising:
receiving with an encoded video stream an indication of a prediction mode and an indication of one or more prediction helper values;
while decoding the encoded video stream, calculating a predicted value for each of at least one sample based on the received indication of the prediction mode and on the received one or more prediction helper values, wherein for each said sample having a corresponding non-zero prediction helper value the predicted value is calculated by applying the predicted helper value to a corresponding value of a reference sample that is located along a prediction direction relative to said sample, where the prediction direction is given by the prediction mode; and
tangibly outputting the decoded video stream to at least one of a computer readable memory and a graphical display, such that the decoded video stream that is output incorporates each of the at least one sample as decoded using the respective calculated predicted value.

16. The computer readable memory according to claim 15, wherein the indication of the one or more prediction helper values are indicated in sets of prediction helper values, each set corresponding to one prediction unit of a coding unit within the encoded video stream.

17. The computer readable memory according to claim 16, wherein for at least one of the sets the predicted values for at least two samples of the set in a same row or same column of the prediction unit are non-linear due to applying a step function to a common prediction helper value when calculating the predicted values for the same row or same column in which lay the at least two samples.

* * * * *